United States Patent [19]
Dupuy

[11] Patent Number: 5,772,822
[45] Date of Patent: Jun. 30, 1998

[54] METHOD OF MANUFACTURING GLASS PANEL AND GASKET ASSEMBLIES

[75] Inventor: Ronald E. Dupuy, Wabash, Ind.

[73] Assignee: GenCorp Inc., Fairlawn, Ohio

[21] Appl. No.: 615,376

[22] Filed: Mar. 14, 1996

[51] Int. Cl.[6] ........................... B29C 35/02; B29C 65/00; B60J 10/02
[52] U.S. Cl. ........................... 156/108; 156/245; 156/293; 156/307.7; 264/236
[58] Field of Search ........................... 156/108, 245, 156/293, 307.7; 264/252, 254, 255, 259, 260, 251, DIG. 59, 236

[56] References Cited

U.S. PATENT DOCUMENTS

| | | | |
|---|---|---|---|
| 2,379,248 | 6/1945 | Muskat | 264/295 |
| 4,168,193 | 9/1979 | Brunet et al. | 156/131 |
| 4,244,908 | 1/1981 | Hirasuna | 264/236 |
| 4,458,155 | 7/1984 | Gruner et al. | 250/559.48 |
| 4,626,185 | 12/1986 | Monnet | 425/110 |
| 4,680,071 | 7/1987 | Candle | 156/218 |
| 4,803,020 | 2/1989 | Valaitis et al. | 264/22 |
| 4,978,712 | 12/1990 | Bair et al. | 525/51 |
| 5,061,429 | 10/1991 | Yoshihara et al. | 264/252 |
| 5,149,168 | 9/1992 | Yada et al. | 296/201 |
| 5,158,638 | 10/1992 | Osanami et al. | 156/108 X |
| 5,164,136 | 11/1992 | Comert et al. | 264/232 |
| 5,171,508 | 12/1992 | Ishizu et al. | 264/236 |
| 5,256,361 | 10/1993 | Keys | 264/236 |
| 5,273,704 | 12/1993 | Scholl et al. | 264/252 |
| 5,330,597 | 7/1994 | Leuchten et al. | 156/108 |
| 5,331,784 | 7/1994 | Agrawal et al. | 156/108 X |

*Primary Examiner*—Francis J. Lorin
*Attorney, Agent, or Firm*—Robert F. Rywalski; David D. Murray

[57] ABSTRACT

A method of manufacturing a glass panel and gasket assembly includes providing a glass panel and a mold defining a correspondingly shaped mold cavity to create a gasket for disposition about the periphery of the glass panel, filling the mold with a gasket material, allowing the gasket material to partially cure, removing the gasket from the mold and installing the gasket on the glass panel, allowing the gasket to continue to cool, shrink and cross-link so that the gasket is in tension and therefore intimately and tightly retained about the periphery of the glass. Metal shaping and reinforcing strips may also be molded into the gasket.

17 Claims, 5 Drawing Sheets

METHOD OF MANUFACTURING GLASS PANEL AND GASKET ASSEMBLIES

BACKGROUND OF THE INVENTION

The invention relates generally to a method of manufacturing glass panel and gasket assemblies and more specifically to a method and the resulting product in which a molded gasket or weatherstrip is removed from a mold while only partially cured, installed on a glass panel such as a vehicle window and allowed to complete curing and cooling while in place on the glass panel.

The manufacture of glass panel, i.e., window, and gasket assemblies, particularly for motor vehicles, is a well developed art. Manufacturing processes for these assemblies traditionally fall into two groups. A first group includes those processes in which a gasket is formed in a mold, cured, cooled and subsequently installed on a correspondingly shaped glass panel. U.S. Pat. Nos. 5,158,638 to Osanami et al. and 5,149,168 to Yada et al. generally define such methods and products. It is also known to utilize glass cleaners, primers and adhesives to facilitate the placement and securement of such gaskets on glass panels.

The second, more contemporary glass and gasket manufacture and assembly method comprehends disposing the glass within the mold and forming the gasket directly on the glass panel about its periphery. U.S. Pat. 4,458,155 to Zanella, 4,626,185 to Monnet and 5,061,429 to Yoshihara et al. teach mold configurations and processes directed to this technique.

Neither of these manufacturing techniques are without problems. As noted, processes in the first group often require primers and adhesives to ensure that the gasket is properly secured to the glass. Moreover, such installation steps are obviously labor intensive and can be difficult when the gasket or weatherstrip which is typically a polymer or elastomer, has fully cured and achieved its full strength and relatively stiffly resilient characteristics.

In-situ molding techniques are also not without their drawbacks. Possibly the most significant drawback relates to the need to position the glass panel within the mold and, because the glass necessarily protrudes into the mold cavity, seal tightly thereagainst. Glass breakage is occasionally a problem due to variations between the shape of an individual glass panel and the design or intended panel shape which is replicated by the shape of the mold. Furthermore, mold to glass seal integrity may be difficult to attain or maintain which can result in leakage, defective product, material loss and excessive cleanup.

The foregoing and an even more extensive review of the two general manufacturing and assembly techniques relating to the production of glass panel and gasket assemblies reveals that improvements in this art which address the aforementioned difficulties would be desirable.

SUMMARY OF THE INVENTION

A method of manufacturing a glass panel, i.e., window, and gasket assembly includes providing a glass panel and a mold defining a correspondingly shaped mold cavity to create a gasket for disposition about the periphery of the glass panel, filling the mold with a gasket molding media, allowing the gasket molding media to partially cure, removing the partially cured gasket from the mold, installing the gasket on the glass panel and allowing the gasket to continue to cool, shrink and cure or cross-link so that the gasket is in tension and therefore intimately and tightly retained about the periphery of the glass panel. Metal shaping and reinforcing strips may also be molded into the gasket.

An alternate embodiment includes a preformed, for example, extruded, gasket portion which may be placed in an appropriately shaped cavity in the mold. The preformed gasket portion may include continuous features such as ribs, flanges, passageways and webs. The mold is then filled and the preform becomes an integral portion of the gasket. This alternate embodiment increases the flexibility of the process and broadens the types of possible gasket configurations and thus product applications.

Thus it is an object of the present invention to provide a novel method of manufacturing a glass panel and gasket assembly.

It is a further object of the present invention to provide a method of manufacturing a glass panel and gasket assembly wherein the gasket is installed on the glass panel before it has fully cured.

It is a still further object of the present invention to provide a method of manufacturing a glass panel and gasket assembly in which the gasket is molded, removed from the mold before cooling and complete curing has occurred and installed about the periphery of a glass panel.

It is a still further object of the present invention to provide a method of manufacturing a glass panel and gasket assembly which does not require the use of cleaners, primers and adhesives.

It is a still further object of the present invention to provide a method of manufacturing a glass panel and gasket assembly having a gasket portion which may be preformed and include openings and webs.

It is a further object of the present invention to provide a glass panel and gasket assembly manufactured by the above recited method.

Further objects and advantages of the present invention will become apparent by reference to the following description of the preferred and alternate embodiments and appended drawings wherein like reference numbers identify the same component, element or feature.

DESCRIPTION OF THE PREFERRED AND ALTERNATE EMBODIMENTS

Figure 1:
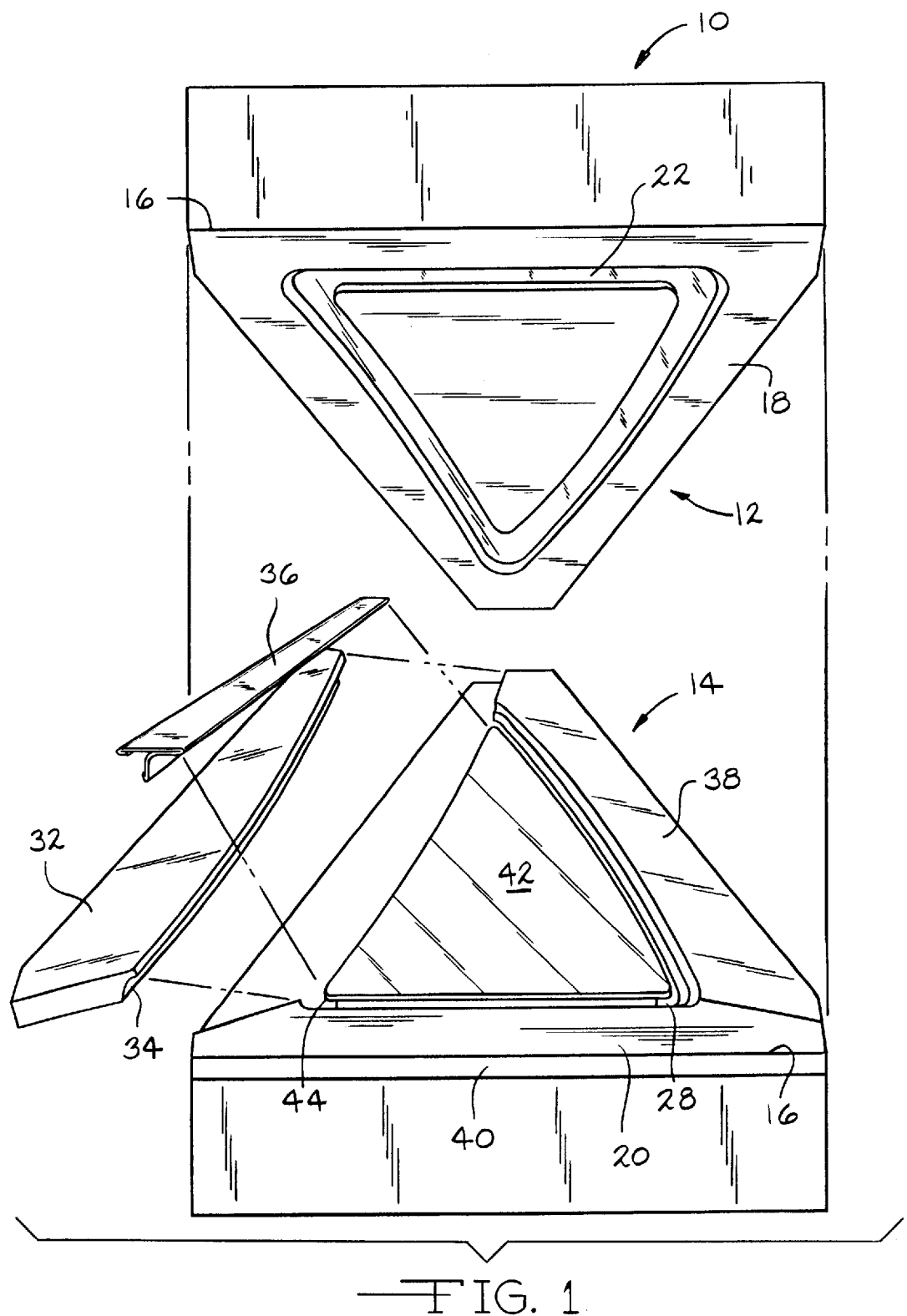
FIG. 1 is a diagrammatic view of an open mold for forming a gasket or weatherstrip according to the present invention.

Referring now to FIG. 1, a mold assembly for practicing the present invention and manufacturing a glass panel and gasket assembly according to the present invention is illustrated and generally designated by the reference numeral 10. The mold assembly 10 includes an upper mold section 12 and a lower mold section 14 which are generally of the same size and overall configuration.

The upper mold section 12 and lower mold section 14 are split by a parting line 16 which is defined by an upper mold parting surface 18 and lower mold parting surface 20. The upper mold section 12 also defines an upper mold cavity 22. The upper mold cavity 22 may have any overall triangular, rectangular, square, trapezoidal, regular or irregular shape which defines a required gasket shape and generally corresponds to the shape of a glass panel, i.e., window, upon which a gasket or weatherstrip formed in the mold assembly 10 will be mounted. The triangular shape illustrated in FIG. 1 is illustrative and utilized for purposes of example only. Preferably, the upper mold section 12 and specifically the upper mold cavity 22 include required draft along the mold sidewalls 24 as those familiar with such devices will readily appreciate and may include relief or undercuts if corresponding features are required in the portion of the gasket or weatherstrip formed by the upper mold section 12.

Turning to the lower mold section 14 also illustrated in FIG. 1, it will be appreciated that a lower mold cavity 28 corresponding to the size and configuration of the upper mold cavity 22 resides in the lower mold section 14. Once again, the mold cavity 28 may have a triangular, rectangular, square, trapezoidal, regular or irregular shape which corresponds to the upper mold cavity 22 and corresponds generally to the shape of the glass panel for which it will fabricate gaskets. The lower mold section 14 also includes a moveable left edge plate 32 having at least one edge 34 which constitutes a portion of the mold lower cavity 28. The moveable left edge plate 32 is preferably one of a plurality of such plates and not only facilitates removal of the gasket from the lower mold cavity 28 but also facilitates the optional insertion of metal shaping and reinforcing strips or inserts, such as the elongate T-shaped insert 36, into the lower mold cavity 28 such that it will be surrounded and encapsulated by the molding media as will be readily appreciated. Should the gasket require it, additional mold sections such as the mirror image, moveable right edge plate 38 and the front edge plate 40 may also be utilized, if desired, to further facilitate removal of the gasket or the positioning of inserts such as the reinforcing strip 36 or, for example, exterior trim strips or escutcheons, prior to molding. It will be appreciated that the edge plates 32, 38 and 40 may either be manually moveable or may be disposed on linear slides or pivot arms which are translated by suitable pneumatic or electric actuators (not illustrated).

The lower mold section 14 also includes a center plate 42 have an overhanging edge or lip 44. The thickness of the overhanging edge or lip 44 is preferably slightly less than the thickness of the glass panel to which the gasket or weatherstrip will be secured. Similarly, the extent of overhang (illustrated in FIG. 3), is preferably equal to the extent of projection of the glass panel into the gasket when the two are assembled.

It will be appreciated that the upper mold section 12 and lower mold section 14 are components of a conventional injection molding machine for use with typical resilient injection molding media including elastomers such as rubber, both natural and artificial, polyvinyl chloride (PVC) and ethylene-propylene-diene monomers (EPDM) and other similar gasket and weatherstrip materials. The upper and lower mold sections 12 and 14, respectively, also include various conventional injection molding machine and mold features and components such as electric heaters 46 for maintaining the mold sections 12 and 14 at a desired temperature and gates and sprues (not illustrated) for providing a flow of the injection molding media into the upper and lower mold cavities 22 and 28.

Figure 2:
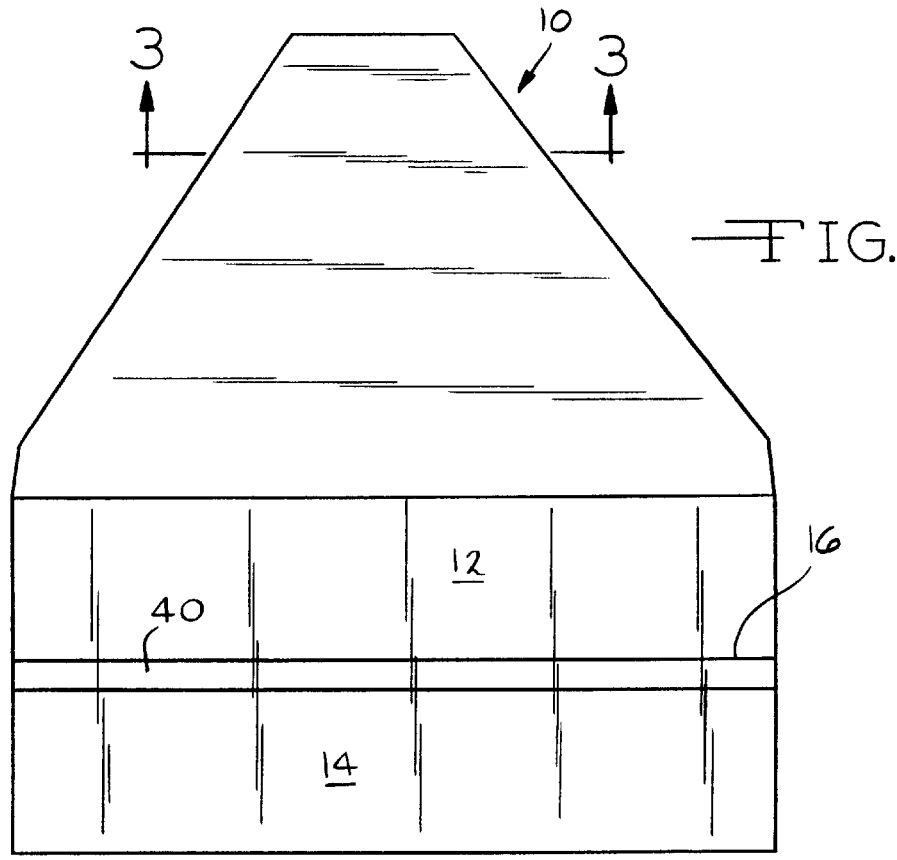
FIG. 2 is a diagrammatic view of a closed mold for forming a gasket or weatherstrip according to the present invention.

Turning now to FIG. 2, the upper mold section 12 and the lower mold section 14 are brought together such that the upper parting surface 18 and the lower parting surface 20 are in contact and the upper mold cavity 22 and the lower mold cavity 28 are in vertical alignment. So disposed, injection moldable media is injected into the upper and lower mold cavities 22 and 28 under appropriate conditions of pressure and temperature.

Figure 3:
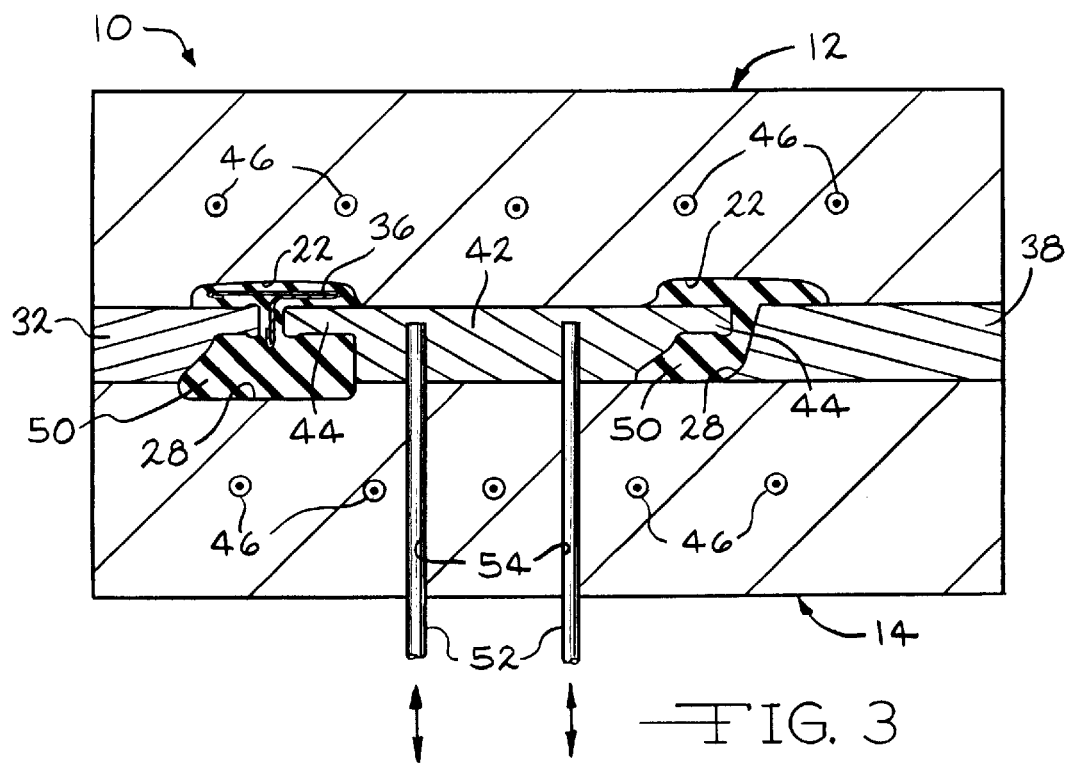
FIG. 3 is a full, sectional view of a mold for forming a gasket or weatherstrip according to the present invention taken along line 3—3 of FIG. 2.

Turning now to FIG. 3, the mold cavities 22 and 28 filled with the injection moldable media form a gasket or weatherstrip 50 which extends about the center plate 42 and also fully surrounds and encapsulates the metal reinforcing strip 36 if utilized, forming a closed, continuous loop. Given the particular injection molding media, the mold sections 12 and 14 remain closed for an appropriate and sufficient period of time such that curing and cross-linking of the injection molding media begins and proceeds to a sufficient extent that the gasket 50 has reasonable structural strength and integrity. By reasonable structural strength and integrity, it is meant that when the mold sections 12 and 14 are opened and the gasket or weatherstrip 50 is removed, the gasket 50, and specifically the material from which it is made, is capable of either maintaining its cross sectional and overall shape or returning to such shape if stretched or flexed. FIG. 3 also illustrates lift pins 52 which are secured to the center plate 42 and extend through apertures 54 in the lower mold section 14 where they are driven by a bi-directional translating mechanism such as cams or actuators (not illustrated).

Figure 4:
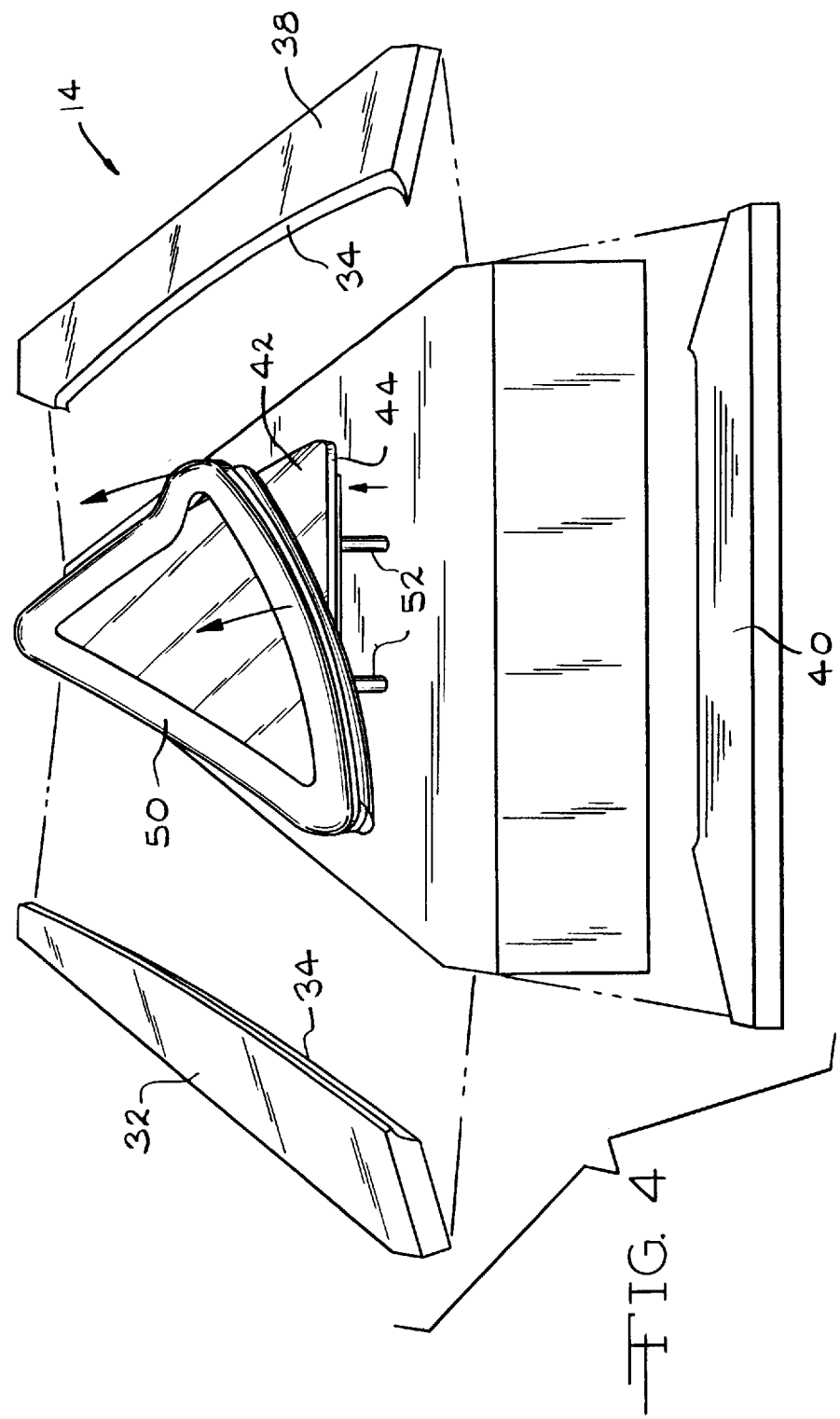
FIG. 4 is a diagrammatic view of a gasket or weatherstrip according to the present invention being removed from the mold while only partially cured.

As illustrated in FIG. 4, when the upper mold section 12 is raised to open the mold cavities 22 and 28, the left edge plate 32, the right edge plate 38 and the front edge plate 40 are also translated away from the center plate 42 and the lift pins 52 are translated upwardly, moving the center plate 42 upward, as well. With the center plate 42 raised, the gasket 50, in a hot, partially cured and cross-linked state, may be removed from the center plate 42 and the lower mold section 14.

Figure 5:
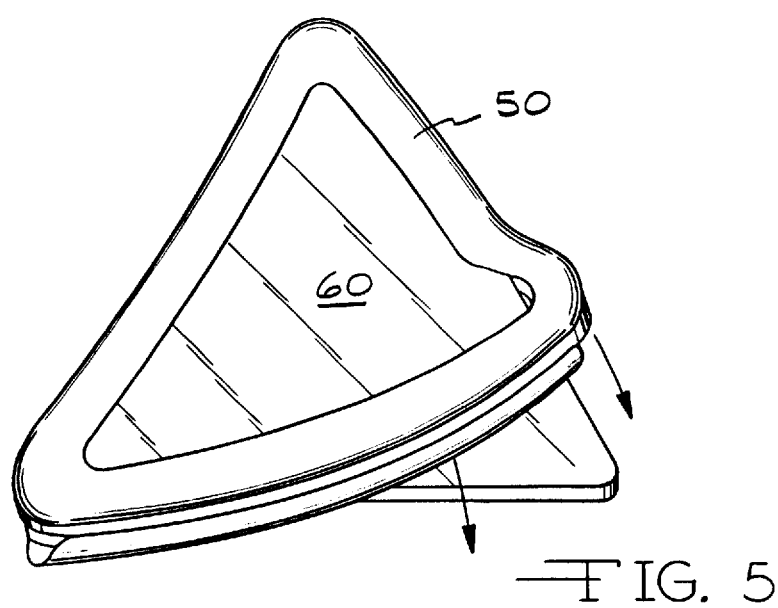
FIG. 5 is a perspective view of a gasket or weatherstrip according to the present invention being installed on a glass panel while only partially cured.

Referring now to FIG. 5, while the gasket 50 is still at an elevated temperature and in a partially cured and cross-linked state, it is disposed upon and stretched about the periphery of a glass panel 60 such that the glass panel 60 generally seats within the gasket 50 in the channel 62 formed by the center plate 42. This operation may be done manually, with the partial assistance of a machine or may be done in a fully automated, robotically driven and controlled operation. In its heated and partially cured and cross-linked state, the gasket 50 is readily and easily stretched about the periphery of the glass panel 60. Furthermore, it is not necessary to utilize cleaners, primers, adhesives and the like on the glass panel 60 to prepare the glass panel 60 for assembly with the gasket or weatherstrip 50, thereby reducing the assembly of the gasket 50 onto the glass panel 60 to a simple mechanical operation.

Figure 6:
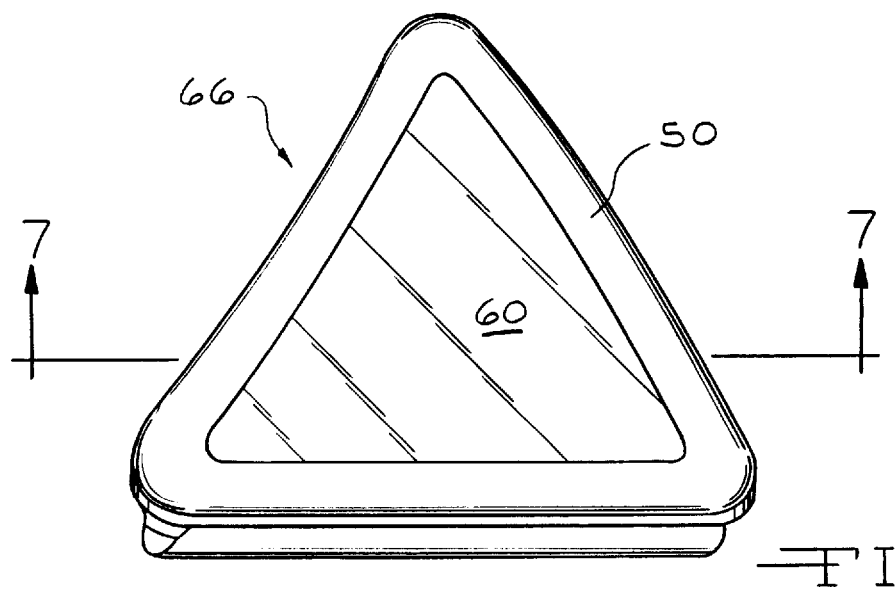
FIG. 6 is a perspective view of a glass panel and gasket or weatherstrip assembly manufactured according to the present invention.
Figure 7:
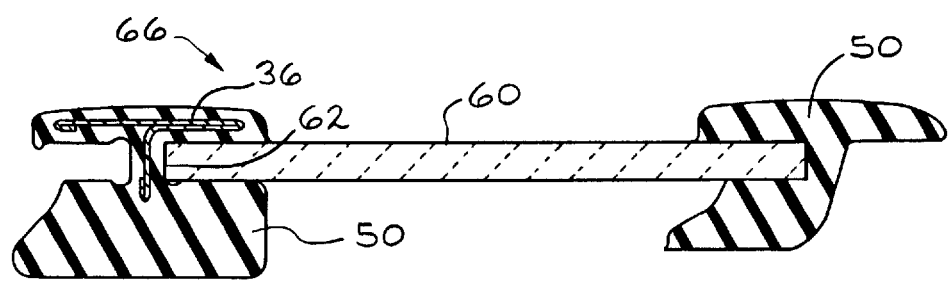
FIG. 7 is a full, sectional view of a glass panel and gasket or weatherstrip assembly manufactured according to the present invention taken along line 7—7 of FIG. 6.

FIGS. 6 and 7 present the final assembled product 66 wherein the unitary gasket 50 has fully cured, cross-linked and cooled. In this final state, the material of the gasket 50 has shrunk such that it is in tension about the glass panel 60 and exhibits the preferred and desired elastic or resilient characteristics of the specific material from which it is molded. The cooling rate of the gasket 50 may be controlled to achieve desired physical characteristics of the media from which it is molded. Note that the reinforcing and shaping metal strip 36 resides in a portion of the gasket 50 and achieves the desired characteristics of strength, shape retention and limited flexibility typical of such inserts.

Figure 8:
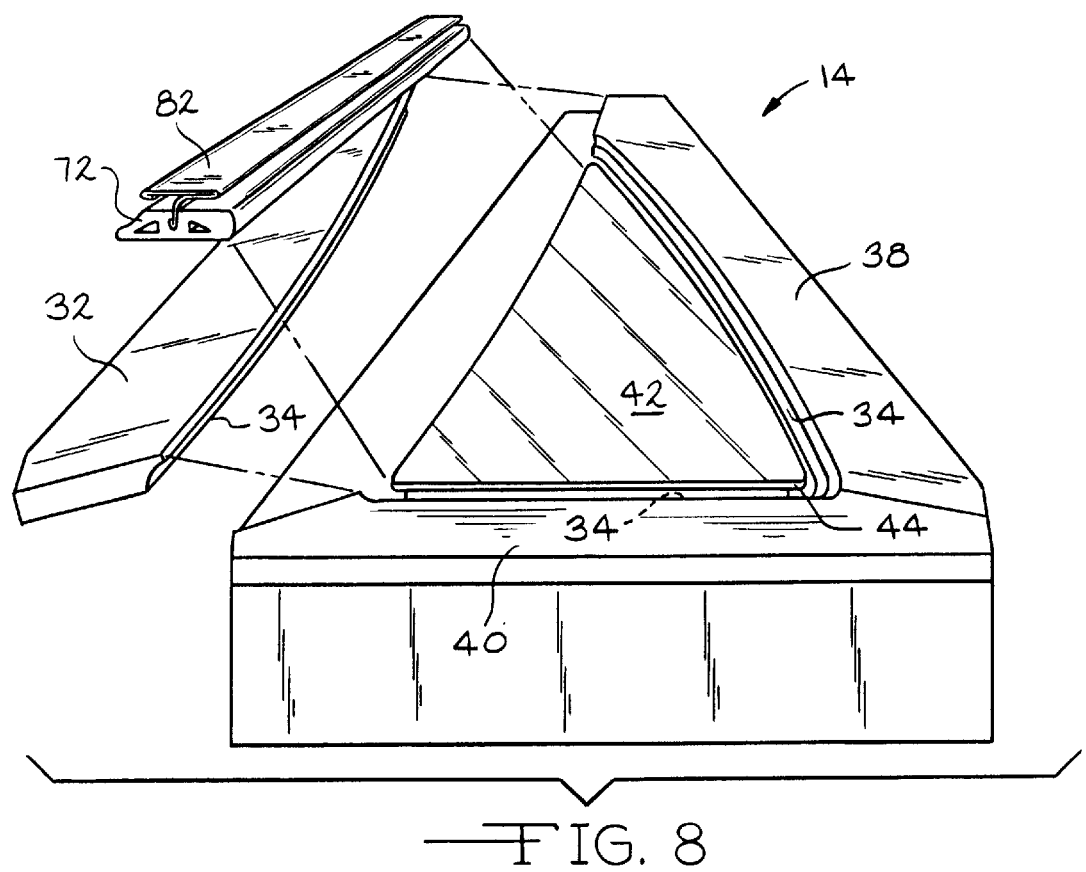
FIG. 8 is a diagrammatic view of a mold for forming a first alternate embodiment of a gasket or weatherstrip according to the present invention; and, FIG. 9 is a full, sectional view of a first alternate embodiment glass panel and gasket or weatherstrip assembly having a metal insert and complex, preformed gasket or weatherstrip portion.
Figure 9:
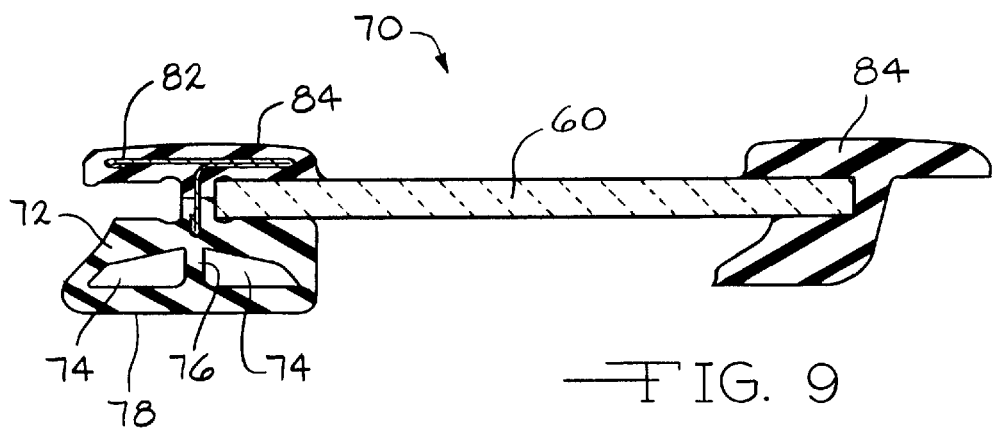

Referring now to FIGS. 8 and 9, a first alternate embodiment process and product 70 is disclosed. The first alternate embodiment process and product 70 may involve the same mold assembly 10 including the upper mold section 12 (illustrated in FIG. 1), the lower mold section 14, the left edge plate 32, the right edge plate 38 and the front edge plate 40. Similarly, the mold assembly 10 includes a center plate 42 having an overhanging lip or edge 44 which, with the edges 34 of the plates 32, 38 and 40, define the lower mold cavity 28.

The primary distinction between the preferred embodiment product 66 and the alternate embodiment product 70 is that the alternate embodiment product 70 includes one or more preformed gasket or weatherstrip portions 72. The gasket portion 72 is preferably extruded but may be formed by other suitable and known fabrication techniques such that the gasket portion 72 includes one or more openings 74 of various cross sections which extends longitudinally along the full length of the gasket portion 72. The openings 74 may be separated by a web 76 or similar feature which controls the compression, i.e., spring rate, and displacement of the lower face 78 of the gasket portion 72 and achieves the desired or necessary structural integrity and compressibility of the gasket portion 72. Other continuous features such as ribs or flanges may also be readily included in the gasket portion 72.

The preformed gasket portion 72 may also include a partially in-situ molded metal shaping and reinforcing member or strip 82 which extends longitudinally along the length of the preformed gasket portion 72. The preformed gasket portion 72, including the metal reinforcing member 82, is placed within the lower mold cavity 28 in the desired location. Multiple and distinct preformed gasket portions 72 may also be used. The upper mold section 12 is then closed against the lower mold section 14 and appropriate gasket molding media is injected into the upper and lower mold cavities 22 and 28. Assuming the injection molding media and the material from which the preformed gasket portion 72 is formed are compatible, the preformed portion 72 will bond with the remaining portion 84 of the gasket. Once again, the gasket 84 will define a reentrant region 86 which receives and is disposed about a glass panel 60 after the gasket has been removed from the mold assembly 10 while it is still relatively hot and before it has significantly cured or cross-linked. After assembly with the glass panel 60, the gasket 84 will cool, further cure and cross-link and shrink about the glass panel 60, thereby intimately retaining it thereon.

The foregoing disclosure is the best mode devised by the inventor for practicing this invention. It is apparent, however, that apparatus, methods and products incorporating modifications and variations will be obvious to one skilled in the art of gaskets and weatherstrips. Inasmuch as the foregoing disclosure is intended to enable one skilled in the pertinent art to practice the present invention, it should not be construed to be limited thereby but should be construed to include such aforementioned obvious variations and be limited only by the scope of the following claims and equivalents thereof.

I claim:

1. A process for manufacturing a glass panel and gasket assembly comprising the steps of:

providing a mold cavity defining a cross sectional shape of a desired gasket, injecting a curable elastomer into said mold cavity to form a gasket having a channel with first and second sidewalls, allowing such elastomer of such gasket to partially cure, removing such partially-cured gasket from such mold cavity, providing a glass panel having a periphery adjacent a first surface and a second surface, inserting such glass panel within the channel of such partially-cured gasket with a portion of each of said surfaces in contact with one of said sidewalls, and completing curing of such elastomer of such gasket, whereby such partially-cured gasket is sealingly disposed on the portions of such surfaces of such glass panel when such partially-cured gasket becomes completely cured.

2. The process of claim 1 further including the step of inserting a metal strip into at least a portion of such mold cavity.

3. The process of claim 1 further including the step of controlling the rate of cooling of such gasket.

4. The process of claim 1 further including the step of inserting an elongate gasket portion having both elastomeric and metal components into such mold cavity.

5. The process of claim 1 wherein such elastomer is rubber.

6. The process of claim 1 wherein such elastomer is an ethylene-propylene-diene monomer.

7. A process for manufacturing a glass panel and gasket assembly, comprising the steps of:

providing a mold cavity defining a shape of a desired gasket, injecting a curable elastomer into such mold cavity to form a gasket and a channel in such gasket, removing such gasket from such mold cavity after only partial curing of such elastomer has occurred, inserting peripherally adjacent first and second surfaces of a glass panel within the channel of such partially-cured gasket, and completing curing of such gasket, whereby such partially-cured gasket is retained on the peripherally adjacent surfaces of such glass panel when such partially-cured gasket becomes completely cured.

8. The process of claim 7 further including the step of inserting a metal strip into at least a portion of such mold cavity.

9. The process of claim 7 further including the step of providing heat to such mold cavity to facilitate partial curing of such elastomer.

10. The process of claim 7 further including the step of providing a preformed gasket portion in such mold cavity.

11. The process of claim 10 wherein such preformed gasket portion includes an elastomeric and a metal component.

12. The process of claim 7 further including the step of providing a center plate in such mold cavity and translating such center plate to facilitate removal of such gasket from such mold cavity.

13. A method for manufacturing a glass panel and gasket assembly using a mold assembly comprising and upper mold section and a lower mold section including a plurality of edges plates and a center plate having a lip, the method comprising the steps of:

providing a mold cavity having a shape corresponding to a shape of a glass panel having first and second surfaces, the mold cavity including an upper mold cavity formed by the upper mold section and a lower mold cavity formed by the lower mold section;

injecting a curable elastomer into the mold cavity to form a gasket about the center plate of the lower mold section, the gasket defining an inside channel having a pair of sidewalls formed by the lip of the center plate;

partially curing the elastomer of the gasket while the upper and lower mold sections are closed;

removing the gasket from the mold cavity by opening the upper and lower mold sections while the elastomer is partially cured;

disposing portions of the first and second surfaces of the glass panel adjacent the sidewalls of the gasket channel while the elastomer is partially cured; and completing curing the elastomer of the gasket while the portions of the first and second surfaces of the glass panel are disposed within the channel of the gasket, whereby the gasket is sealingly disposed on portions of the first and second surfaces of the glass panel without using adhesives.

14. The method according to claim 13, further comprising the step of inserting a metal strip into at least a portion of the mold cavity.

15. The method according to claim 13, further comprising the step of inserting an elongate gasket portion having both elastomeric and metal components into the mold cavity.

16. The method according to claim 13, wherein the elastomer is made of a material capable of maintaining its cross sectional shape when partially cured.

17. The method according to claim 13, wherein the upper and lower mold sections are in vertical alignment with one another.

* * * * *